United States Patent
Ogawa et al.

(10) Patent No.: US 6,822,421 B2
(45) Date of Patent: *Nov. 23, 2004

(54) BIPEDAL ROBOT WITH POSITION FOR ENERGY STORAGE DEVICE

(75) Inventors: Kenichi Ogawa, Wako (JP); Takuro Koyanagi, Wako (JP); Susumu Miyazaki, Wako (JP); Hideaki Takahashi, Wako (JP); Hiroshi Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/381,679
(22) PCT Filed: Sep. 20, 2001
(86) PCT No.: PCT/JP01/08184

§ 371 (c)(1),
(2), (4) Date: May 15, 2003

(87) PCT Pub. No.: WO02/28602

PCT Pub. Date: Apr. 11, 2002

(65) Prior Publication Data

US 2004/0027086 A1 Feb. 12, 2004

(51) Int. Cl.$^7$ .............................................. H01M 10/46
(52) U.S. Cl. ..................................................... 320/107
(58) Field of Search ................................. 320/107, 112, 320/114; 700/245; 180/8.1, 8.5, 8.6; 318/568.11, 568.12; 901/1

(56) References Cited

U.S. PATENT DOCUMENTS

| | | | |
|---|---|---|---|
| 6,064,167 A | | 5/2000 | Takenaka et al. |
| 6,580,969 B1 | * | 6/2003 | Ishida et al. ................. 700/245 |
| 6,640,160 B2 | * | 10/2003 | Takahashi et al. ........... 700/245 |
| 2004/0050595 A1 | * | 3/2004 | Saito et al. .................. 180/8.1 |

* cited by examiner

*Primary Examiner*—Edward H. Tso
(74) *Attorney, Agent, or Firm*—Rankin, Hill, Porter & Clark LLP

(57) ABSTRACT

An electric energy storage device has a power supply for operating a robot and is mounted on an upper body of the robot at a position such that the electric energy storage device has a center-of-gravity point present upwardly and rearwardly of the center-of-gravity point of the robot from which the electric energy storage device is removed and which is in an upstanding state. Shoulders of arms extending from the upper body of the robot have a center positioned forwardly of the center-of-gravity point. An imaging device for robot vision is supported on an upper end of the upper body of the robot by an attachment, which is positioned forwardly of the center-of-gravity point. It is thus possible to achieve attitude stability with ease when the robot walks and works.

9 Claims, 2 Drawing Sheets

BIPEDAL ROBOT WITH POSITION FOR ENERGY STORAGE DEVICE

TECHNICAL FIELD

The present invention relates to a bipedal robot.

BACKGROUND ART

Bipedal robots which have in recent years been proposed for practical use by the present applicant and others and which have been known in general are basically human-shaped robots. Like human beings, they have two legs extending from a hip at the lower end of an upper body (torso), two arms extending from shoulders on the left and right opposite sides of the upper body, and a head mounted on the upper end of the body and incorporating an imaging device for robot vision.

Some of the robots of the above type are supplied with electric power for operating the legs and arms from an external source through a cable. However, those robots have a limited range of movement, and the handling of the cable is complex. Therefore, it is desirable for robots themselves to carry an electric energy storage device such as a battery or the like as a power supply for operating them.

Electric energy storage devices such as a battery or the like which are mounted on robots as the power supply for operating the robot need to have a relatively large capacity for allowing the robot to move continuously for a sufficient period of time, and hence are relatively large in size and weight. Bipedal robots are essentially more liable to lose attitude stability when subjected to disturbance or the like than robots having many legs.

It has therefore been an important task to study which location and what layout a large and heavy electric energy storage device is to be mounted in on a bipedal robot, for achieving attitude stability when the robot walks and works.

The present invention has been made in view of the above background. It is an object of the present invention to provide a bipedal robot having an electric energy storage device mounting structure which makes it possible to easily achieve attitude stability when the robot walks and works.

DISCLOSURE OF THE INVENTION

In order to achieve the above object, a bipedal robot according to the present invention is available in two aspects. According to the first aspect, a bipedal robot having an electric energy storage device for operating the robot is characterized in that said electric energy storage device is mounted on an upper body of the robot such that the electric energy storage device has a center-of-gravity point present at a position upward of the center-of-gravity point of the robot from which said electric energy storage device is removed and which is in an upstanding state.

It is customary to control the attitude stabilization of a bipedal robot based on an inverted pendulum-type dynamic model as disclosed in Japanese laid-open patent publication No. 5-337849 or U.S. Pat. No. 5,459,659 by the present applicant. The attitude stabilization is controlled by controlling a torque around ankles of the robot with the behavioral characteristics of perturbation of the position of the upper body of the robot being simulated by the behavioral characteristics of an inverted pendulum. A robot under such attitude stabilization control can achieve better robot attitude stability if the center of gravity of the overall robot is in a higher position than it is in a lower position (a vertical position closer to the floor that is contacted by the feet of the robot).

According to the first aspect of the present invention, as described above, the electric energy storage device is mounted on the upper body of the robot such that the electric energy storage device has a center-of-gravity point present at a position upward of the center-of-gravity point of the robot from which said electric energy storage device is removed and which is in an upstanding state. Specifically, the upper body is the torso (body) of the robot from which the legs and arms extend.

With the above arrangement, the center of gravity of the robot including the electric energy storage device is present in a higher vertical position on the robot, thus increasing the stability of the attitude when the robot walks and works.

The first aspect of the present invention is optimum for a bipedal robot whose attitude stabilization is controlled based on an inverted pendulum-type dynamic model, as described above.

According to the second embodiment, a bipedal robot having an electric energy storage device for operating the robot and arms extending from shoulders on an upper body of the robot is characterized in that said electric energy storage device is mounted on the upper body of the robot such that the electric energy storage device has a center-of-gravity point present at a position rearward, in a forward and rearward direction of the robot, of the center-of-gravity point of the robot from which said electric energy storage device is removed and which is in an upstanding state, and the shoulders on the upper body of the robot, to which said arms are coupled, are disposed in a position forward, in the forward and rearward direction of the robot, of the center-of-gravity point of the robot from which said electric energy storage device is removed and which is in the upstanding state.

In the present specification, the forward and rearward direction of the robot means a direction perpendicular to the direction (lateral direction) in which the two legs of the robot are parallel to each other and the vertical direction of the robot when the robot is in the upstanding state.

According to the second aspect of the present invention, since the shoulders on the upper body of the robot, to which the arms of the robot are coupled, are disposed in a position near a frontal surface of the robot, when the arms are extended forwardly of the robot, they can grip an object in a relatively far position forward of the robot. At this time, when the arms of the robot are extended forwardly, the center of gravity of the robot except the electric energy storage device is displaced relatively largely forwardly of the robot. However, the electric energy storage device which is a heavy object is positioned rearwardly of the robot (on the rear surface thereof). Consequently, the center of gravity of the overall robot assembly including the electric energy storage device is not displaced largely forwardly of the robot. As a result, the stability of the attitude of the robot is achieved with ease even when the robot works with the arms extended forwardly. According to the second aspect of the present invention, therefore, it is possible to achieve the stability of the attitude of the robot with ease while the robot is working with the arms at a relatively far position forward of the robot.

According to the second aspect of the present invention, as with the first aspect described above, the electric energy storage device is preferably mounted on the upper body of the robot such that the electric energy storage device has a center-of-gravity point present at a position upward of the center-of-gravity point of the robot from which said electric energy storage device is removed and which is in an upstanding state.

With the above arrangement, the stability of the attitude can be increased when the robot walks and works.

In the second aspect of the present invention, if said robot has an imaging device present upwardly of the upper body of the robot and supported on an upper end of the upper body of the robot, then said imaging device and the upper body of the robot are preferably coupled to each other by a joint disposed in a position forward, in the forward and rearward direction of the robot, of the center-of-gravity point of the robot from which said electric energy storage device is removed and which is in the upstanding state.

With the above arrangement, since the imaging device and the arms are present near the frontal surface of the robot, the imaging device and the arms, and the electric energy storage device on the rear surface of the robot tend to be balanced in weight, making it possible to achieve the stability of the attitude of the robot with greater ease.

According to the first and second aspects of the present invention, an electric energy storage device mounting unit disposed on an upper body of the robot for mounting said electric energy storage device therein preferably has an opening defined in an upper end thereof when the robot is in the upstanding state, said electric energy storage device being insertable into and removable from said electric energy storage device mounting unit through said opening.

With the above arrangement, if the robot is relatively small, then since the electric energy storage device can be inserted into and removed from the electric energy storage device mounting unit through the opening in the upper end thereof, the electric energy storage device can easily be removed and mounted for maintenance or the like. Furthermore, inasmuch as the electric energy storage device can be removed and mounted while the robot is squatting down, it is possible to remove and mount the electric energy storage device while keeping the robot in a stable attitude. As the electric energy storage device mounting unit has the opening in its upper end, even when the robot works at various attitudes, the electric energy storage device is free of the danger of being dislodged from the electric energy storage device mounting unit. Particularly in the first aspect of the present invention in which the electric energy storage device is mounted in a location on an upper portion of the robot, the electric energy storage device is liable to suffer damage if the electric energy storage device falls off due to a failure of a lid over the opening of the electric energy storage device mounting unit. However, the above arrangement is effective to prevent such a shortcoming from occurring.

The electric energy storage device mounting unit has an electric reception terminal disposed on a lower end thereof when the robot is in the upstanding state, for detachable connection to an electric supply terminal of the electric energy storage device as mounted in said electric energy storage device mounting unit.

With the above arrangement, when the electric energy storage device is inserted into the electric energy storage device mounting unit, the electric supply terminal of the electric energy storage device is connected to the electric reception terminal on the upper body of the robot, and both the terminals remain reliably connected to each other under the weight of the electric energy storage device.

BEST MODE FOR CARRYING OUT THE INVENTION

An embodiment of the present invention will be described below with reference to FIGS. 1 and 2.

Figure 1:
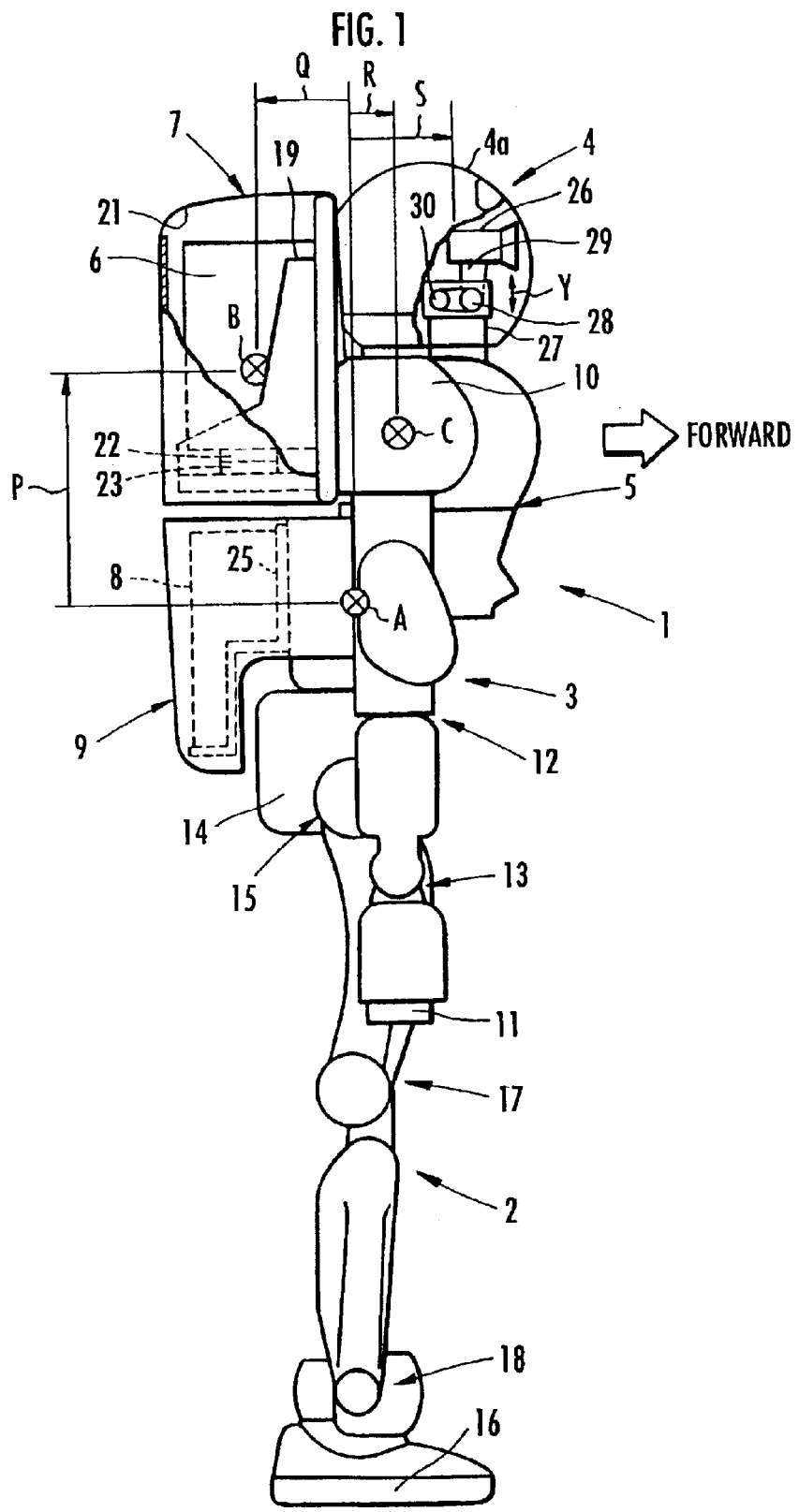
FIG. 1 is a side elevational view of a bipedal robot, in an upstanding state, according to an embodiment of the present invention.

As shown in FIG. 1, a bipedal robot according to the present embodiment is a human-shaped robot having an upper body 1 (torso), legs 2, arms 3, and a head 4. Since FIG. 1 is a side elevational view of the robot in an upstanding state, only one leg 2 and only one arm 3 are shown in FIG. 1. However, the robot actually has a pair of left and right legs 2 and a pair of left and right arms 3 like a human being. The leg 2 and the arm 3 which are illustrated are a right leg and a right arm, respectively, as viewed in the forward direction of the robot.

The upper body 1 of the robot has a main body 5 to which the legs 2 and the arms 3 are coupled and which supports the head 4, a first auxiliary body 7 serving as an electric energy storage device mounting unit for mounting an electric energy storage device 6 as a power supply for operating the robot, and a second auxiliary body 9 for mounting a control unit 8 (an electric circuit unit having a microcomputer, etc, hereinafter referred to as ECU 8) for controlling the operation of the robot.

According to the present embodiment, the electric energy storage device 6 comprises a rechargeable secondary battery such as a lithium ion battery or the like. However, the electric energy storage device 6 may comprise a large-capacity capacitance such as an electric double-layer capacitor.

Shoulders 10 are provided on respective left and right sides of an upper portion of the main body 5. The arms 3 extend from shoulder joint mechanisms (not shown) placed in the shoulders 10. Each of the arms 3 has an elbow joint 12 and a wrist joint 13 disposed between a hand 11 and the shoulder 10 and arranged successively from the shoulder 10.

The main body 5 has a hip 14 at its lower end. The legs 2 extend downwardly from a pair of left and right hip joints 15, respectively, coupled to a parallel link mechanism (not shown) placed in the hip 14. Each of the legs 2 has a knee joint 17 and an ankle joint 18 disposed between a foot 16 and the hip joint 15 and arranged successively from the hip joint 15.

The first auxiliary body 7 is shaped as a casing mounted on a rear surface of the upper portion of the main body 5. The first auxiliary body 7 has a support member 19 disposed therein and fixed to the rear surface of the upper portion of the main body 5 for mounting the electric energy storage device 6 thereon. The electric energy storage device 6 is placed and supported on the support member 19.

Figure 2:
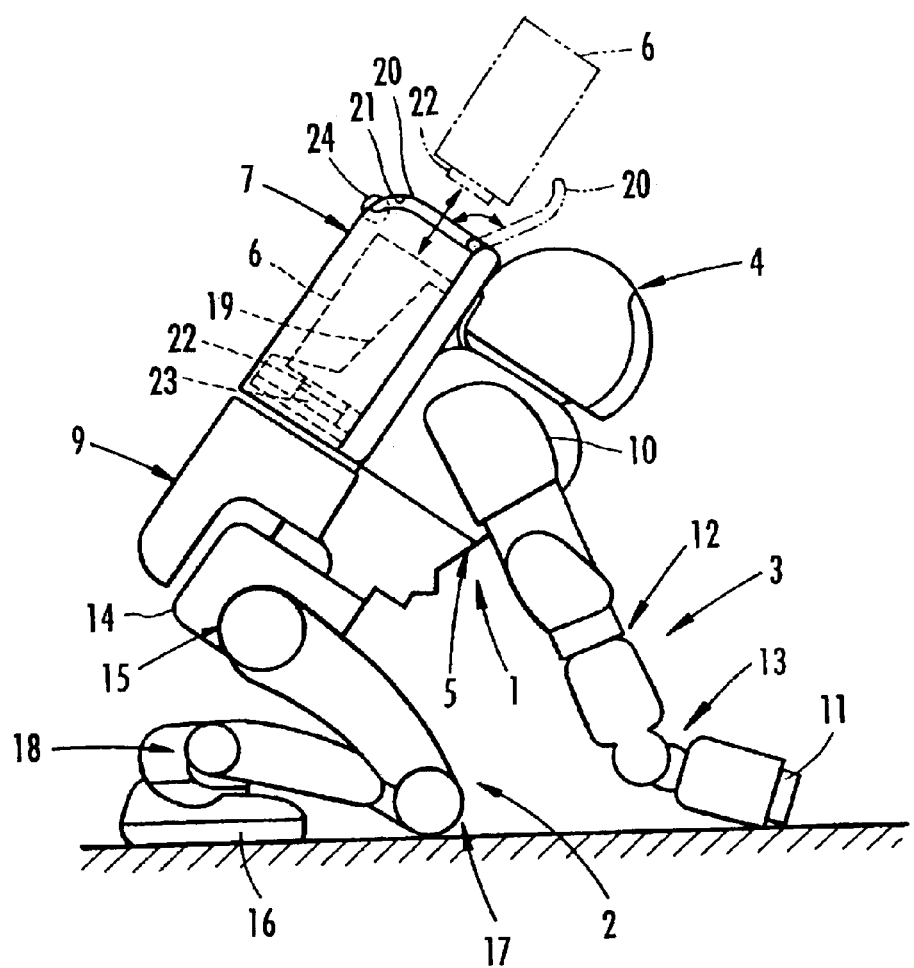
FIG. 2 is a side elevational view of the bipedal robot shown in FIG. 1 which is in an attitude for removing and mounting an electric energy storage device.

As shown in FIG. 2, the first auxiliary body 7 has an opening 21 defined in an upper end thereof and openable and closable by an opening/closing lid 20. When the opening/closing lid 20 is opened as indicated by the imaginary lines in FIG. 2, the electric energy storage device 6 can be inserted into and removed from the first auxiliary body 7 through the opening 21. An electric reception terminal 23 in the form of a connector is disposed on the lower end (which is positioned immediately below the electric energy storage device 6 when the robot is in the upstanding state) of the support member 19 which supports the electric energy storage device 6. The electric reception terminal 23 fits with an electric supply terminal 22 (which outputs the electric energy from the electric energy storage device 6) in the form of a connector disposed on a lower surface of the electric energy storage device 6. The electric reception terminal 23 distributes and supplies the electric energy from the electric energy storage device 6 to electric motors (not shown) associated with the joints of the robot and the ECU 8, etc. When the electric energy storage device 6 is inserted into the first auxiliary body 7 through the opening 21 and supported on the support member 19, the electric reception terminal 23 fits with the electric supply terminal 22 of the electric energy storage device 6 and is electrically connected thereto.

When the opening/closing lid 20 closes the opening 21 (as indicated by the solid lines in FIG. 2), the opening/closing lid 20 is locked in the closed position by a lock mechanism (not shown). An electric motor 24 is mounted in the first auxiliary body 7 for unlocking the opening/closing lid 20 from the locked state.

As shown in FIG. 1, the second auxiliary body 9 is disposed directly below the first auxiliary body 7 and is shaped as a casing mounted on a lower portion of the main body 5. The second auxiliary body 9 houses therein a support member 25 fixed to a rear surface of the lower portion of the main body 5 and supporting the ECU 8 thereon.

The head 4 has an imaging device (camera) 26 for robot vision housed in an outer shell 4a (casing), the imaging device 26 having its visual field directed forwardly. The imaging device 26 is coupled by a joint 29 to a speed reducer 28 which is mounted on an attachment 27 erected from a front portion of the upper end of the main body 5. The imaging device 26 is swingable about the axis of rotation of the speed reducer 28 in unison with rotation of the speed reducer 28. The speed reducer 28 is mounted on the attachment 27 such that the axis of rotation thereof is directed laterally (the direction normal to the sheet of FIG. 1). As indicated by the arrow Y in FIG. 1, the imaging device 26 is swingable to vertically move its visual field. The rotational drive force of the electric motor 30 is transmitted through a belt or the like to the imaging device 28, thus swinging the imaging device 26 as described above.

Although not shown, the bipedal robot according to the present embodiment also has, in addition to the above structural details, electric motors for actuating the joints of the legs 2 and the arms 3, sensors for detecting angular displacements of the electric motors (angular displacements of the joints), sensors for detecting loads and moments acting on the feet 16 of the legs 2 and the hands 11 of the arms 3, and sensors for detecting an angle of inclination and an angular velocity of inclination of the upper body 1.

The ECU 8 controls the electric motors based on information obtained from the sensors (including the imaging device 26) and a predetermined program thereby to control operation of the robot (i.e., to control the walking of the robot through operation of the legs 2, and to control the working of the robot through operation of the arms 3). In the present embodiment, the ECU 8 controls operation of the joints of the legs 2 based on an inverted pendulum-type dynamic model as disclosed in Japanese laid-open patent publication No. 5-337849 or U.S. Pat. No. 5,459,659, for thereby controlling attitude stabilization when the robot walks and works.

With the bipedal robot of the above structure according to the present embodiment, when the electric energy storage device 6 is removed (detached) and the robot is in the upstanding state as shown in FIG. 1, the robot has its center of gravity present at a point A shown in FIG. 1 (substantially at the center of the main body 5) (the point A will hereinafter be referred to as reference center-of-gravity point A), for example. The upstanding state referred to above is a state in which the left and right legs 2 are parallel to each other in the lateral direction, the legs 2 and the upper body 1 are extended vertically and erected, and the left and right arms 3 are extended vertically downwardly.

When the electric energy storage device 6 is mounted on the robot and supported on the support member 19 in the first auxiliary body 7, the electric energy storage device 6 has its own center of gravity (positioned substantially at the center of the electric energy storage device 6) present at a point B shown in FIG. 1 (the point B will hereinafter be referred to as electric energy storage device center-of-gravity point B). The electric energy storage device center-of-gravity point B is present upwardly of the reference center-of-gravity point A (see the arrow P in FIG. 1), and rearwardly of the reference center-of-gravity point A (see the arrow Q in FIG. 1). Stated otherwise, with the robot according to the present embodiment, the first auxiliary body 7 and the support member 19 are disposed such that the electric energy storage device center-of-gravity point B is in the above positional relationship to the reference center-of-gravity point A.

According to the present embodiment, furthermore, the shoulders 10 are mounted on the main body 5 such that their center C is present forwardly of the reference center-of-gravity point A (see the arrow R in FIG. 1). The imaging device 26 is supported on the attachment 27 erected from the upper end of the main body 5 forwardly of the reference center-of-gravity point A, and disposed in a position near a foremost surface of the robot forwardly of the reference center-of-gravity point A (see the arrow S in FIG. 1).

With the bipedal robot according to the present embodiment, since the electric energy storage device center-of-gravity point B of the electric energy storage device 6 which is a heavy object is present upwardly of the reference center-of-gravity point A as described above, the overall robot assembly with the electric energy storage device 6 mounted thereon has its center of gravity present in a high position close to the upper end of the overall robot assembly (a position higher than the reference center-of-gravity point A). Therefore, the behavioral characteristics of the robot attitude are well in conformity with the behavioral characteristics of an inverted pendulum. As a result, by controlling attitude stabilization of the robot based on an inverted pendulum-type dynamic model, the attitude stabilization of the robot can be controlled appropriately for achieving good attitude stability of the robot.

Furthermore, the center C of the shoulders 10 is positioned forwardly of the reference center-of-gravity point A, so that that the shoulders 10 are positioned near the frontal surface of the robot. When the arms 3 are extended forwardly, the hands of the arms 3 reach a relatively far position forward of the robot, and can grip an object in such a far position.

Since the imaging device 26 is positioned near the foremost surface of the robot, the visual field of the imaging device 26 can cover a vertically wide range simply vertically swinging the imaging device 26 only without the need for a mechanism for vertically swinging the head 4 of the robot. In particular, the imaging device 26 can image its feet and a surrounding area when the robot walks up and down a stair or the like.

Because the shoulders 10 and the imaging device 26 are positioned forwardly of the reference center-of-gravity point A near the frontal surface of the robot, when both the arms 3 are extended forwardly, the center of gravity of the robot except the electric energy storage device 6 is displaced relatively largely forwardly of the robot. However, the electric energy storage device 6 is positioned rearwardly of the reference center-of-gravity point A and mounted on the rear surface of the robot, opposite to the shoulders 10 and the imaging device 26. Consequently, even when both the arms 3 are extended forwardly, the center of gravity of the overall robot assembly including the electric energy storage device 6 is not particularly displaced forwardly of the robot. Thus, the center of gravity of the overall robot assembly including the electric energy storage device 6 has its position changing relatively small forwardly and rearwardly between the state in which both the arms 3 are hanging downwardly and the state in which they are extended forwardly. As a result, the stability of the attitude of the robot when the robot works with the arms 3 is achieved with ease.

With the robot according to the present embodiment, for maintenance of the electric energy storage device 6 (e.g., for charging or replacing the electric energy storage device 6), the electric energy storage device 6 is removed and mounted as follows:

When the ECU 8 is given a command for maintenance of the electric energy storage device 6 from an external source, the ECU 8 controls the robot to take an attitude state as shown in FIG. 2. In this attitude state, the feet 16 and the knee joints 17 of the legs 2 are held in contact with the floor, and the hands 11 of the arms 3 are also held in contact with the floor. (This attitude state is similar to the attitude of a human being in which the knees and hands are put down on the floor for a bow.) The robot is controlled to take this attitude state for the purpose of reliably achieving the stability of the attitude of the robot.

When the ECU 8 confirms that the robot has taken the attitude state as shown in FIG. 2 based on output signals from the sensors (not shown) which detects angular displacements of the electric motors (not shown) for actuating the joints of the legs 2 and the arms 3, the ECU 8 energizes the electric motor 24 on the first auxiliary body 7 to unlock the opening/closing lid 20 from the closed position.

At this time, the ECU 8 also switches from the power supply for itself and the electric motors to a backup electric energy storage device (not shown) which is mounted on the robot as a power supply for temporary operation. Since the backup electric energy storage device is used to carry out temporary operation of the robot, it may be of a relatively small capacity and is smaller in size and weight than the electric energy storage device 6.

Then, the operator or the like opens the opening/closing lid 20, and removes or mounts the electric energy storage device 6 through the opening 21 in the first auxiliary body 7 (i.e., inserts the electric energy storage device 6 into or removes the electric energy storage device 6 from the first auxiliary body 7).

According to the present embodiment, therefore, after controlling the robot to take the attitude state for reliably achieving the stability of the attitude of the robot, the electric energy storage device 6 can easily be removed and mounted through the upper portion of the first auxiliary body 7.

When the electric energy storage device 6 is inserted into the first auxiliary body 7, the electric supply terminal 22 of the electric energy storage device 6 fits with the electric reception terminal 23 of the support member 19 under the weight of the electric energy storage device 6. Therefore, the terminals 22, 23 can reliably be electrically connected to each other.

INDUSTRIAL APPLICABILITY

The bipedal robot according to the present invention is useful as a robot which carries an electric energy storage device for operating the robot and which moves on two legs and performs various works with two arms, like a human being.

What is claimed is:

1. A bipedal robot having an electric energy storage device for operating the robot, wherein:

said electric energy storage device is mounted on an upper body of the robot such that the electric energy storage device has a center-of-gravity point present at a position upward of a center-of-gravity point of the robot from which said electric energy storage device is removed and which is in an upstanding state.

2. A bipedal robot having an electric energy storage device for operating the robot and arms extending from shoulders on an upper body of the robot, wherein:

said electric energy storage device is mounted on the upper body of the robot such that the electric energy storage device has a center-of-gravity point present at a position rearward, in a forward and rearward direction of the robot, of a center-of-gravity point of the robot from which said electric energy storage device removed and which is in an upstanding state, and the shoulders on the upper body of the robot, to which said arms are coupled, are disposed in a position forward, in the forward and rearward direction of the robot, of the center-of-gravity point of the robot from which said electric energy storage device is removed and which is in the upstanding state.

3. The bipedal robot according to claim 2, wherein said electric energy storage device is mounted on the upper body of the robot such that the center-of-gravity point of the electric energy storage device is present at a position upward of the center-of-gravity point of the robot from which said electric energy storage device is removed and which is in an upstanding state.

4. The bipedal robot according to claim 2, wherein said robot has an imaging device present upwardly of the upper body of the robot and supported on an upper end of the upper body of the robot, said imaging device and the upper body of the robot are coupled to each other by a joint disposed in a position forward, in the forward and rearward direction of the robot, of the center-of-gravity point of the robot from which said electric energy storage device is removed and which is in the upstanding state.

5. The bipedal robot according to claim 1, wherein an electric energy storage device mounting unit disposed on the upper body of the robot for mounting said electric energy storage device therein has an opening defined in an upper end thereof when the robot is in the upstanding state, said electric energy storage device being insertable into and removable from said electric energy storage device mounting unit through said opening.

6. The bipedal robot according to claim 5, wherein said electric energy storage device mounting unit has an electric reception terminal disposed on a lower end thereof when the robot is in the upstanding state, for detachable connection to an electric supply terminal of the electric energy storage device as mounted in said electric energy storage device mounting unit.

7. The bipedal robot according to claim 3, wherein said robot has an imaging device present upwardly of the upper body of the robot and supported on an upper end of the upper body of the robot, said imaging device and the upper body of the robot are coupled to each other by a joint disposed in a position forward, in the forward and rearward direction of the robot, of the center-of-gravity point of the robot from which said electric energy storage device is removed and which is in the upstanding state.

8. The bipedal robot according to claim 2, wherein an electric energy storage device mounting unit disposed on the upper body of the robot for mounting said electric energy storage device therein has an opening defined in an upper end thereof when the robot is in the upstanding state, said electric energy storage device being insertable into and removable from said electric energy storage device mounting unit through said opening.

9. The bipedal robot according to claim 8, wherein said electric energy storage device mounting unit has an electric reception terminal disposed on a lower end thereof when the robot is in the upstanding state, for detachable connection to an electric supply terminal of the electric energy storage device as mounted in said electric energy storage device mounting unit.

* * * * *

UNITED STATES PATENT AND TRADEMARK OFFICE
CERTIFICATE OF CORRECTION

PATENT NO.   : 6,822,421 B2
DATED        : November 23, 2004
INVENTOR(S)  : Ogawa et al.

It is certified that error appears in the above-identified patent and that said Letters Patent is hereby corrected as shown below:

Title page,
Item [30], Foreign Application Priority Data, should read as follows:
-- Foreign Application Priority Data
  Sept. 29, 2000   (JP)   2000-300408
  Jan. 15, 2001   (JP)   2001-6344 --.

Column 8,
Line 25, after "device" insert -- is --.

Signed and Sealed this

Fifth Day of April, 2005

JON W. DUDAS
*Director of the United States Patent and Trademark Office*